June 25, 1968   J. D. WINTERS ET AL   3,389,645
APPARATUS AND METHOD FOR FOLDING AND SEALING CARTONS
Filed April 19, 1965   11 Sheets-Sheet 1

INVENTOR
JOHN D. WINTERS
SIMON VISSER
BASIL L. KRISTOFF
JACK G. HERRING

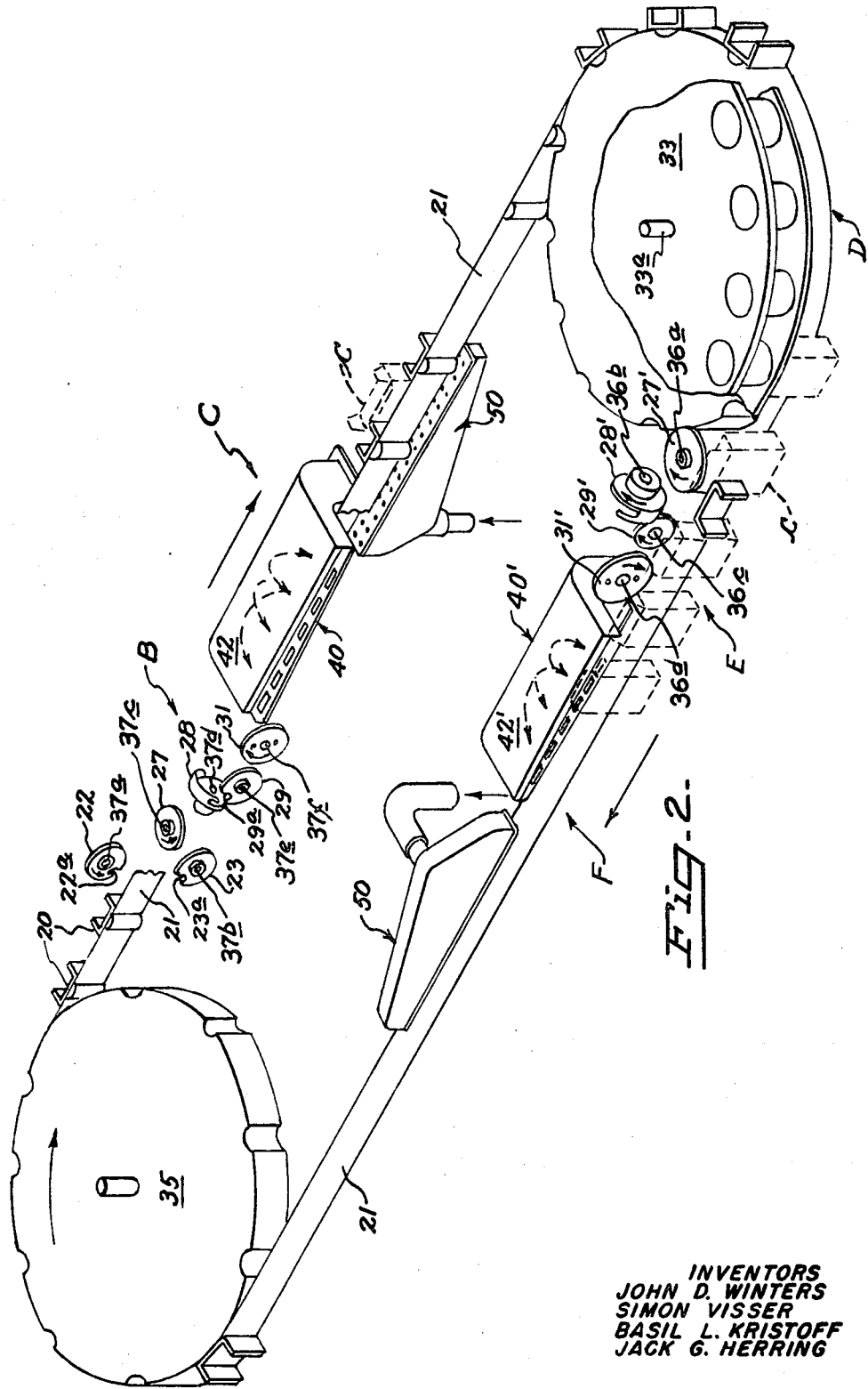

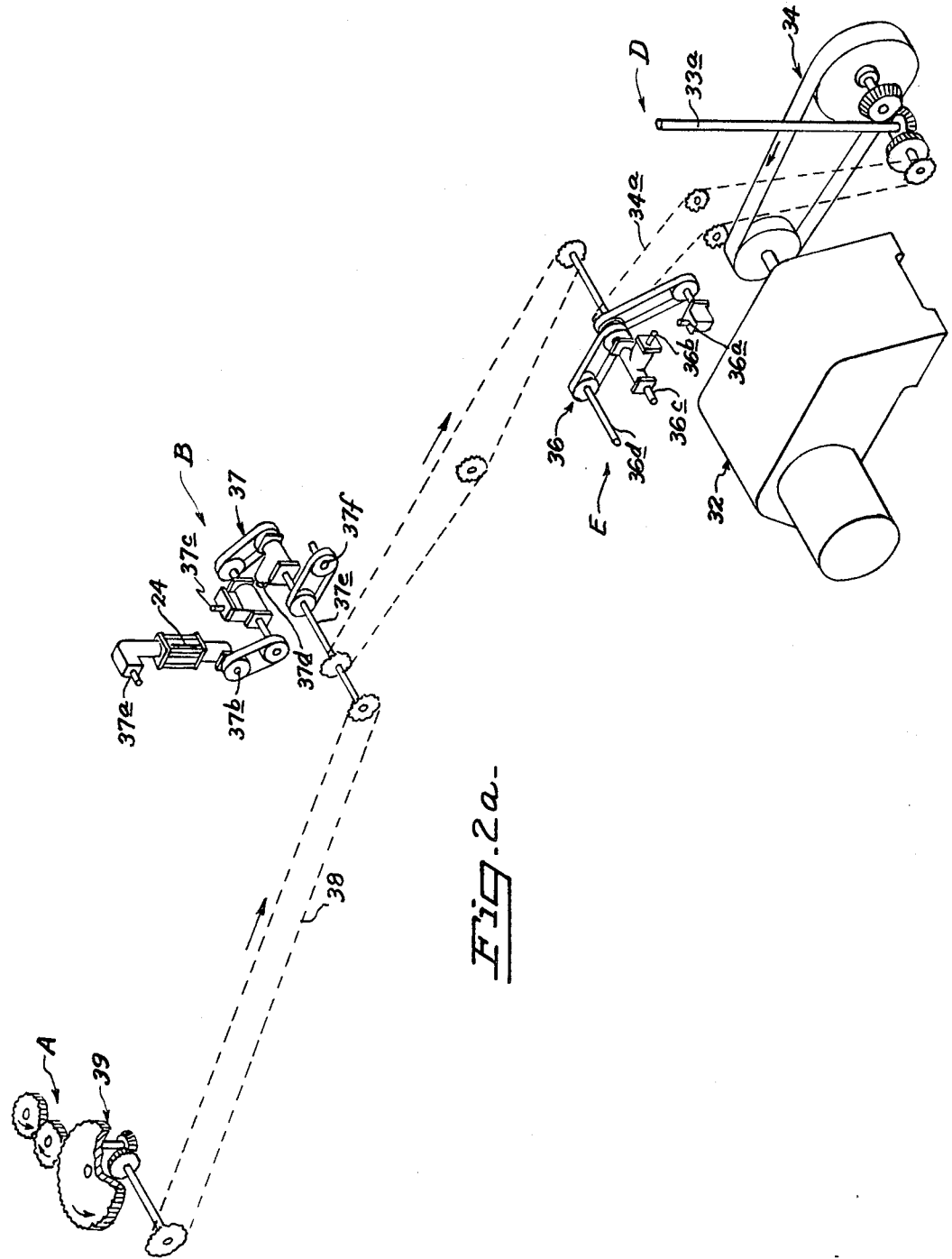

June 25, 1968     J. D. WINTERS ET AL     3,389,645
APPARATUS AND METHOD FOR FOLDING AND SEALING CARTONS
Filed April 19, 1965     11 Sheets-Sheet 4

INVENTORS
JOHN D. WINTERS
SIMON VISSER
BASIL L. KRISTOFF
JACK G. HERRING

June 25, 1968  J. D. WINTERS ET AL  3,389,645
APPARATUS AND METHOD FOR FOLDING AND SEALING CARTONS
Filed April 19, 1965  11 Sheets-Sheet 6
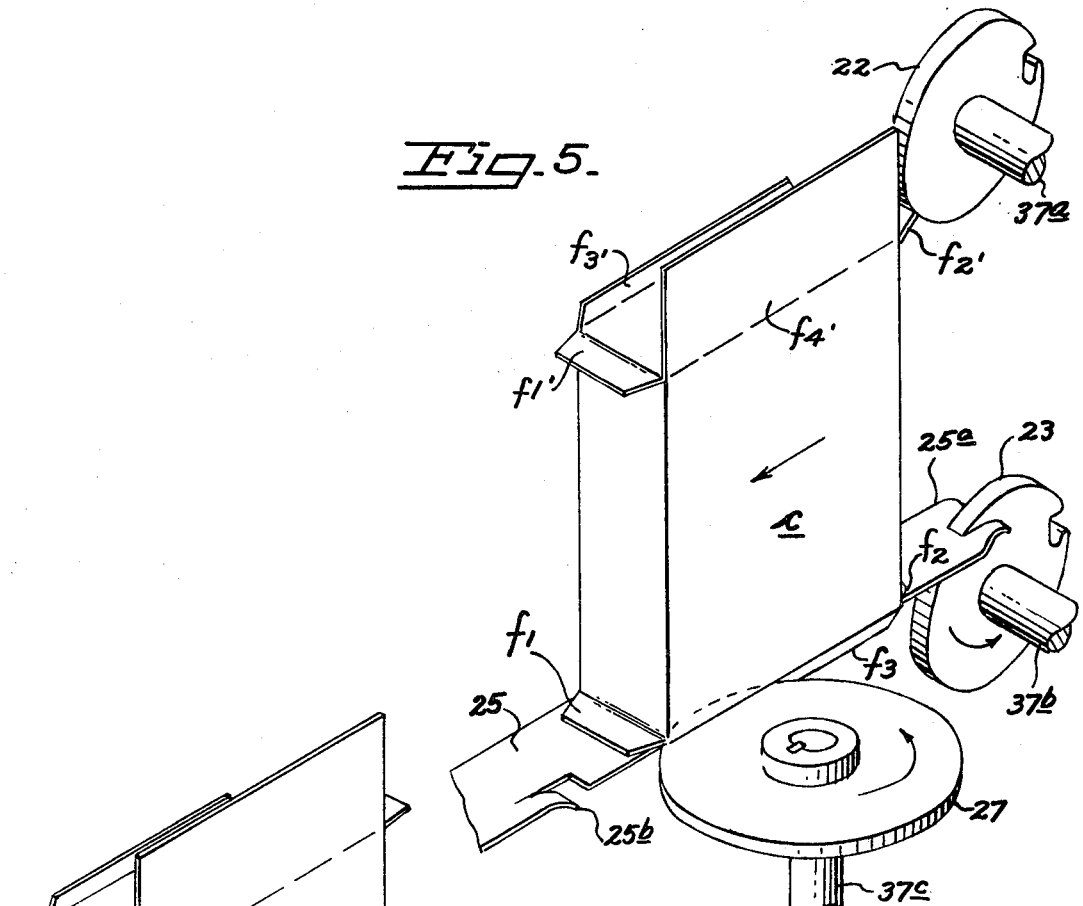
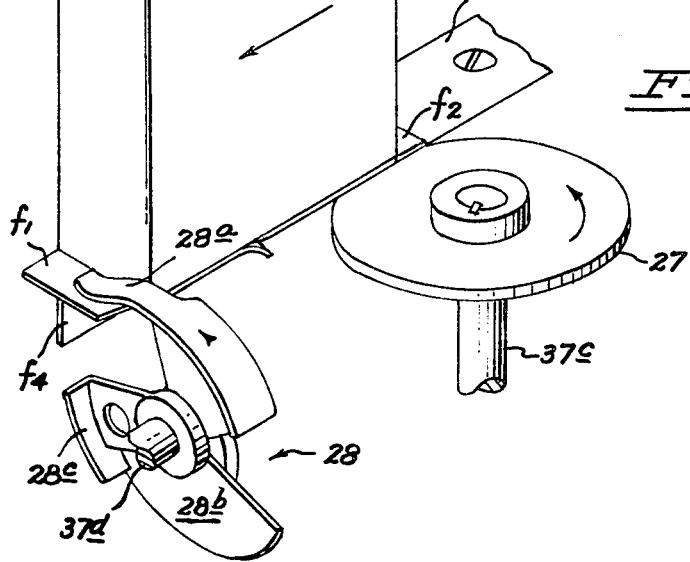
INVENTORS
JOHN D. WINTERS
SIMON VISSER
BASIL L. KRISTOFF
JACK G. HERRING

INVENTORS
JOHN D. WINTERS
SIMON VISSER
BASIL L. KRISTOFF
JACK G. HERRING

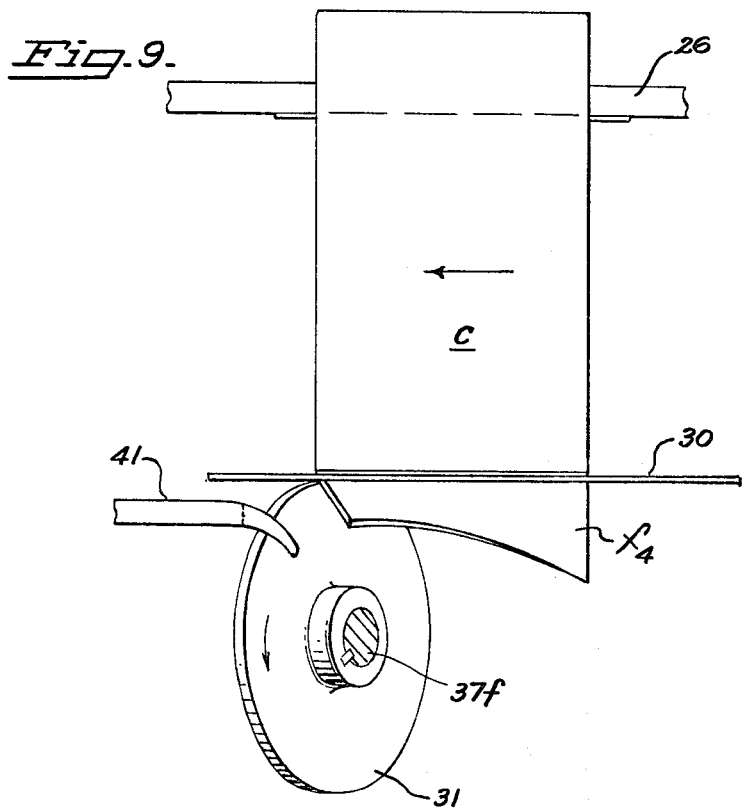
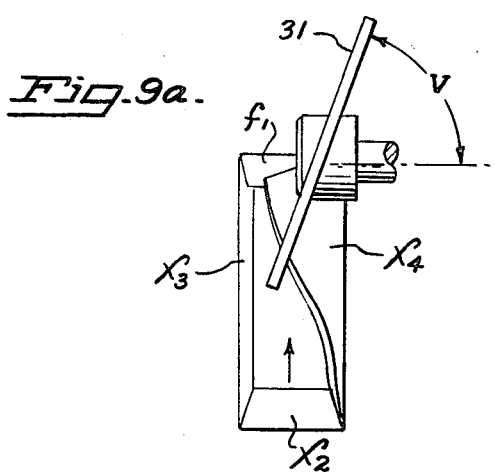

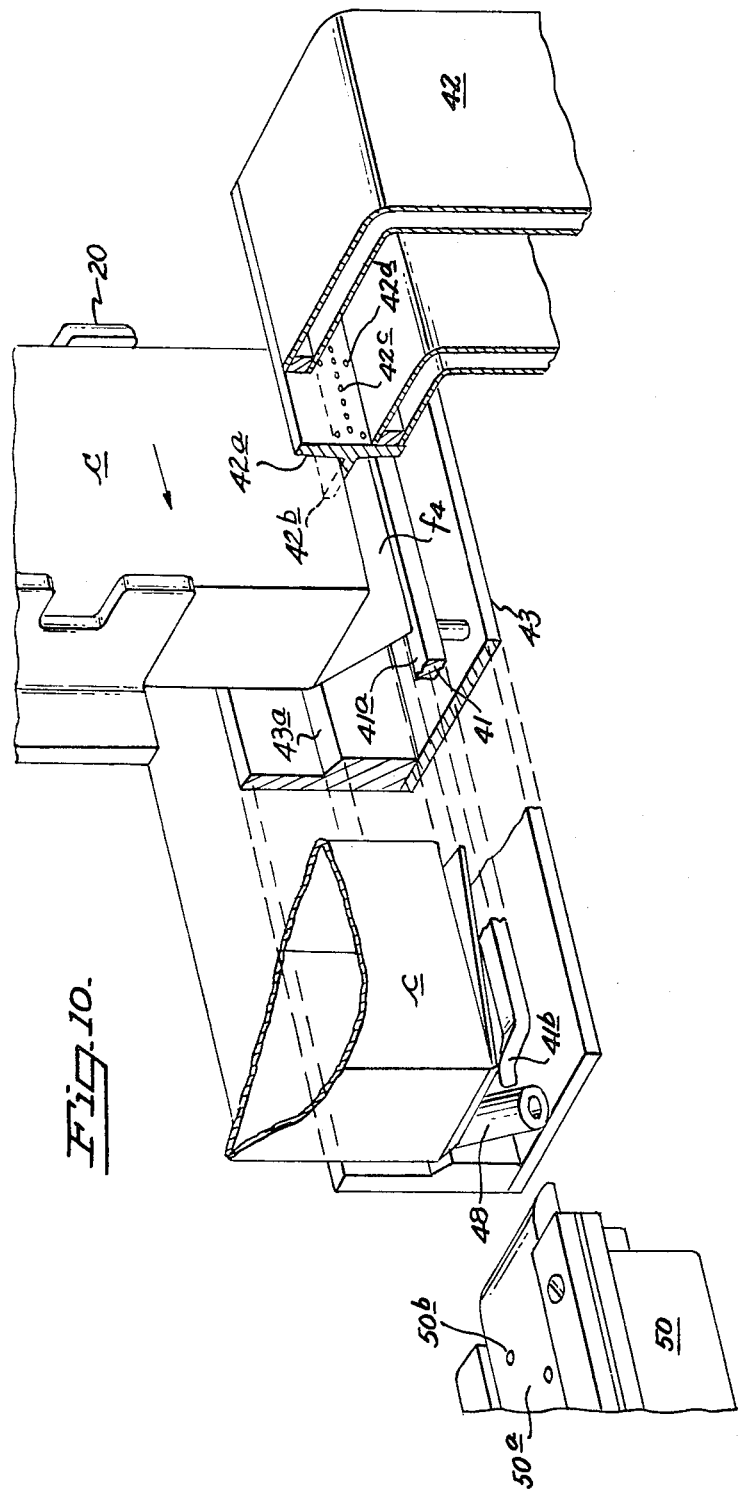

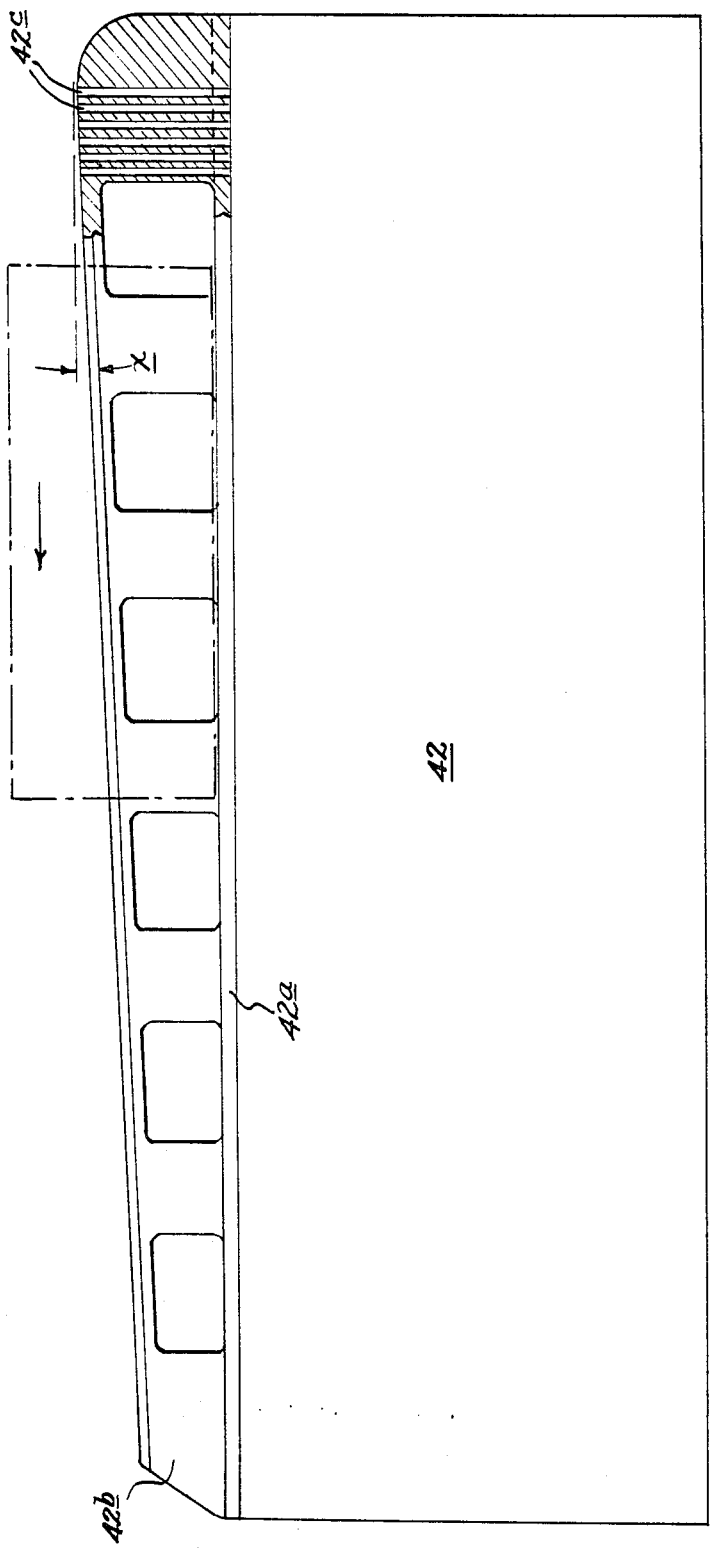

3,389,645
APPARATUS AND METHOD FOR FOLDING
AND SEALING CARTONS
John D. Winters, Oakland, Simon Visser, Walnut Creek,
Basil L. Kristoff, San Mateo, and Jack G. Herring, Fremont, Calif., assignors to Fibreboard Corporation, a corporation of Delaware
Filed Apr. 19, 1965, Ser. No. 457,893
45 Claims. (Cl. 93—44)

ABSTRACT OF THE DISCLOSURE

Apparatus for progressively folding and sealing adhesively treated flaps of a carton including a conveyor for moving the cartons in a line of flight, folding means including spinning fingers and wobble bars for folding the flaps into superimposed positions and a flap sealer including an end edge contact device for guiding the carton flaps and a heated fluid discharge means which extends across the support.

---

This invention relates to an apparatus and method for folding and sealing cartons and more particularly relates to an apparatus and method whereby suitably treated carton flaps may be folded into position and thereafter sealed to provide a high moisture barrier coating at the formed closure of the carton.

The packaging of frozen goods, for example, has given rise to a number of problems which have not as yet been fully resolved. Such packages have generally comprised a paperboard carton having mechanically locked end flaps and a carton overwrap. The overwrap is treated to prevent moisture or other contaminants from penetrating the carton as well as to prevent escapage of the contents thereof. Due to the complexities involved, conventional apparatus and methods employed for such a packaging operation necessitate an extended carton flight to assure suitable packaging. Furthermore, an efficient carton seal is not always assured.

The availability of heat sealable adhesives or coatings capable of being sealed, such as polyethylene, has encouraged the packaging art to dispense with the use of such a conventional carton construction and attending apparatus and methods. In particular, it has been found feasible to apply such an adhesive or coating directly to a paperboard carton for purposes of sealing the end flaps thereof.

This invention provides a practicable and novel apparatus and method for expeditiously and efficiently sealing suitably treated carton flaps to provide a tightly sealed carton. One of the marked advantages accruing from the application of this invention is the ability to carry forth the packaging operation within a limited line of carton flight.

Briefly, carton flaps are sequentially folded into position by rotary motion, precisely held in a predetermined position, subjected to a heated fluid and thereafter sealed. When the novel concepts of this invention are applied to a frozen food packaging operation, the lower flaps are sealed, the product is discharged into the package through the open end of the carton, and the upper flaps at the open end of the carton are then sealed.

In accordance with the above discussions, an object of this invention is to provide an efficient and non-complex apparatus and method for expeditiously folding and sealing the ends of adhesively treated carton flaps within a limited line of carton flight.

Another object of this invention is to provide a carton flap folding means comprising a series of rotary elements arranged to sequentially fold carton flaps into a predetermined position prior to sealing.

A further object of this invention is to provide a carton flap folding means comprising a rotary element having a notch portion arranged thereon to engage and fold a carton flap into a predetermined position.

A further object of this invention is to provide a carton flap folding means comprising one or more rotary means arranged to engage and fold a carton flap and further arranged to have a component of motion which is substantially the same as the linear speed of the carton to thus reduce carton drag.

A further object of this invention is to provide a carton flap folding means comprising a rotary wobble means for folding a carton flap within a limited line of carton flight.

A further object of this invention is to provide a carton flap sealing means comprising uniquely arranged carton supporting means for maintaining the carton and the flaps thereof in a pre-arranged position for sealing purposes.

A further object of this invention is to provide a carton flap sealing means comprising a uniquely arranged heat sealer for directing a heated fluid to critical, adhesively treated positions of carbon flaps for sealing purposes.

A further object of this invention is to provide an "air veyor" for creating an air cushion of uniform pressure for reducing carton drag or for aiding in solidifying heated, adhesively treated areas of the carton without causing damage to the surface finish thereof.

A further object of this invention is to provide a method for expeditiously folding and positioning carton flaps about their hinge lines during a limited carton line of flight.

A further object of this invention is to provide a method for expeditiously sealing cartons wherein heated air is supplied directly and trapped at critical adhesively-treated areas of the carton flaps.

Other and more specific objects of this invention will become apparent from the following description and accompanying drawings wherein:

FIG. 1 discloses the primary components of a packaging machine comprising the apparatus and method for folding and sealing cartons of this invention;

FIG. 2 schematically illustrates the folding and sealing apparatus employed in the packaging machine shown in FIG. 1;

FIG. 2a schematically illustrates the drive train for the packaging machine of FIG. 1;

FIGS. 3, 3a, 3b, and 3c illustrate a carton which may be sealed pursuant to the apparatus and method teachings hereinafter set forth;

FIGS. 4 through 9a sequentially illustrate the apparatus and method steps for folding the end flaps of the carton of FIG. 3, prior to the sealing thereof;

FIG. 10, having portions broken away for clarification purposes, illustrates the apparatus and method steps for guiding and supplying a heated fluid to critical portions of the carton flaps for sealing purposes;

FIG. 13 is a top plan view, having portions broken away for clarification purposes, particularly disclosing a nozzle bar of the heat sealer of FIG. 12.

FIGS. 1 and 2 illustrate the primary components of a packaging machine utilizing the carton folding and sealing apparatus of this invention. Only the primary components of the machine have been shown in order to more readily facilitate an understanding of this invention.

Figure 3:
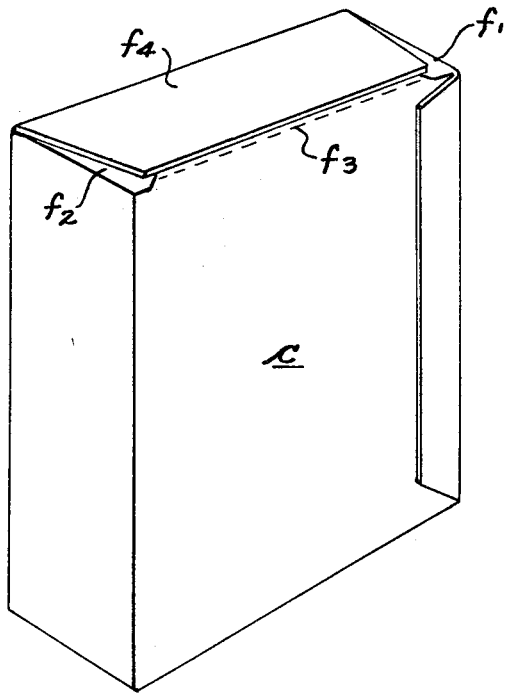
Figure 3A:
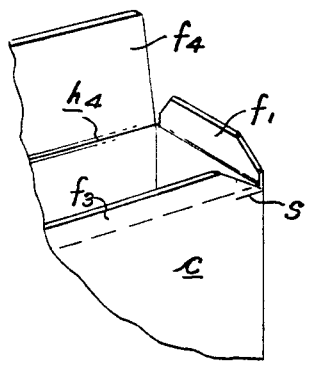
Figure 3B:
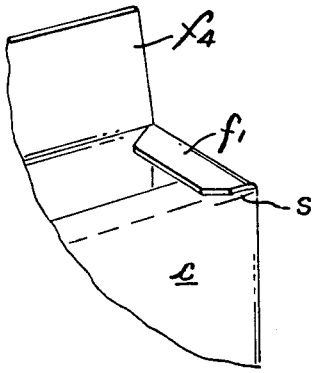
Figure 3C:
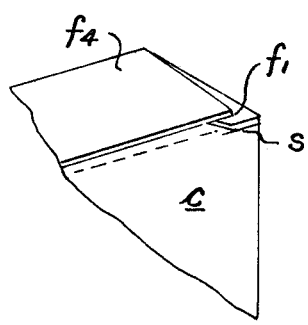

A similar type of packaging machine is disclosed in U.S. Patent No. 3,060,654, issued on Oct. 30, 1962 to A. R. Lubersky et al. for a "Carton Setting Up Machine." FIG. 3 discloses a carton $c$, flaps $f_1$ through $f_4$ of which may be folded and sealed in accordance with the teachings hereinafter set forth. As will be hereafter more fully understood, the sealed portions of the carton flaps may be pretreated with a suitable heat sealable adhesive or coating such as polyethylene.

The machine may comprise the following stations: station A comprising a carton feeder for opening and placing flattened tubular cartons between the lugs of a continuously moving conveyor; station B comprising first folding means for folding the lower flaps of the cartons; station C comprising first sealing means for sealing the folded lower flaps; station D comprising a filling apparatus for discharging a product into the top, open end of a carton; station E comprising second folding means for folding the upper flaps of the cartons; and station F comprising second sealing means for sealing the folded upper flaps.

This invention is directed primarily to the apparatus and method for folding and sealing the end flaps of the carton, illustrated at stations B, C, E, and F. As will be hereafter more fully understood, although the following discussions pertain to the folding and sealing of the lower flaps $f_1$–$f_4$ of the carton at stations B and C respectively, such discussions also apply to the folding and sealing of the upper flaps $f_1'$–$f_4'$. Otherwise stated, station B and C are substantial duplicates of stations E and F, respectively.

The cartons may be indexed from a carton magazine and thereafter opened by a mechanical vacuum feeding means at station A, such as that disclosed in U.S. patent application 294,803 to J. D. Winters for "Apparatus and Method for Opening Cartons," filed July 10, 1963, or disclosed in the above-mentioned U.S. Patent No. 3,060,654. The feeder then deposits each opened carton between lugs 20 of endless belt 21. The carton is held captively between two adjacent lugs in a vertical position and moves in a horizontal line or plane of flight towards the first folding means at station B.

For purposes of the following discussions, the vertical and horizontal disposition of the various elements may be considered as being relative to the above conveyor or carton horizontally disposed line or plane of flight.

APPARATUS FOR FOLDING AND SEALING CARTONS

Carton folding means

Figure 1:
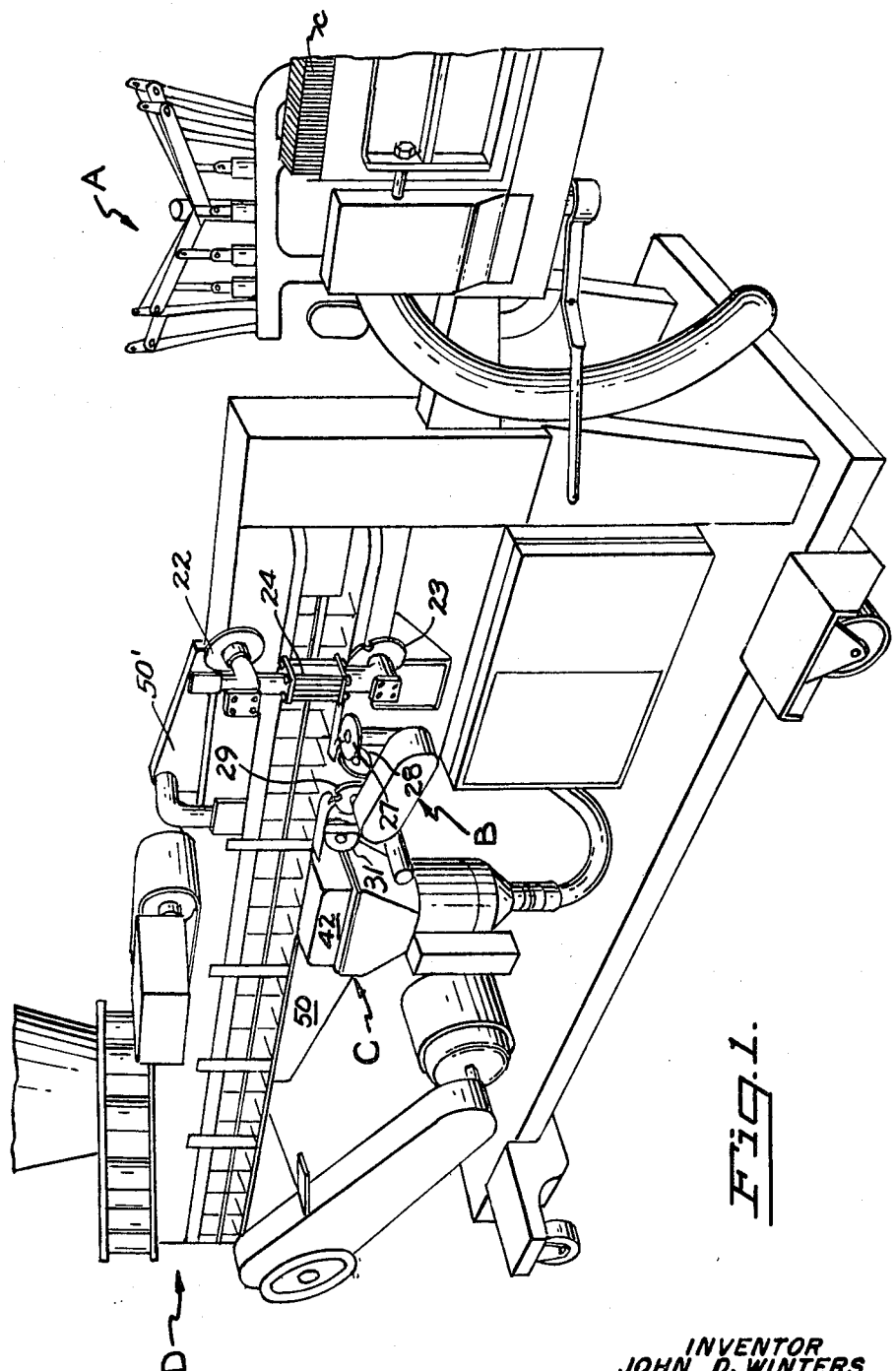

The folding means at station B in FIG. 1 comprises vertically disposed first and second tucker wheels 22 and 23 operatively connected together for simultaneous rotation by a common drive shaft 24 (FIG. 1) and suitable gearing means (not shown). The first and second tucker wheels each comprise a circular disc, the smooth peripheries of which are interrupted by notch portions 22a and 23a, respectively (FIG. 2).

As will be hereafter more fully understood, the drive means disclosed in FIG. 2a, employed for driving the rotary elements, will depend upon the various linear and rotational speeds desired to carry forth the carton forming steps. The specific design of such drive means is, of course, well within the skill of the art and per se does not comprise novel aspects of this invention.

Progressing in the direction of carton flight and referring again to FIG. 2 taken in conjunction with FIGS. 4–9, the folding means further comprises a backup blade 25 (FIG. 4) and a hold down bar 26, both horizontally disposed and having respective sloped, bifurcated portions 25a and 26a which cooperate with the first and second tucker wheels for flap positioning purposes. A horizontally disposed spinning disc 27 is arranged to have the top surface thereof rotate in close proximity to the underside of blade 25 (FIG. 5). A cut-out, ramp or sloped portion 25b of the blade is arranged to also cooperate with disc 27 during the flap folding operation.

A vertically disposed spinning finger 28 comprises a finger portion 28a (FIG. 6) arranged at a radius from the rotational axis thereof which is greater than the remaining peripheral portions of the spinning finger. Portions 28b and 28c of this element may be utilized for flap retaining or positioning purposes as will be hereafter more fully explained.

Figure 7:
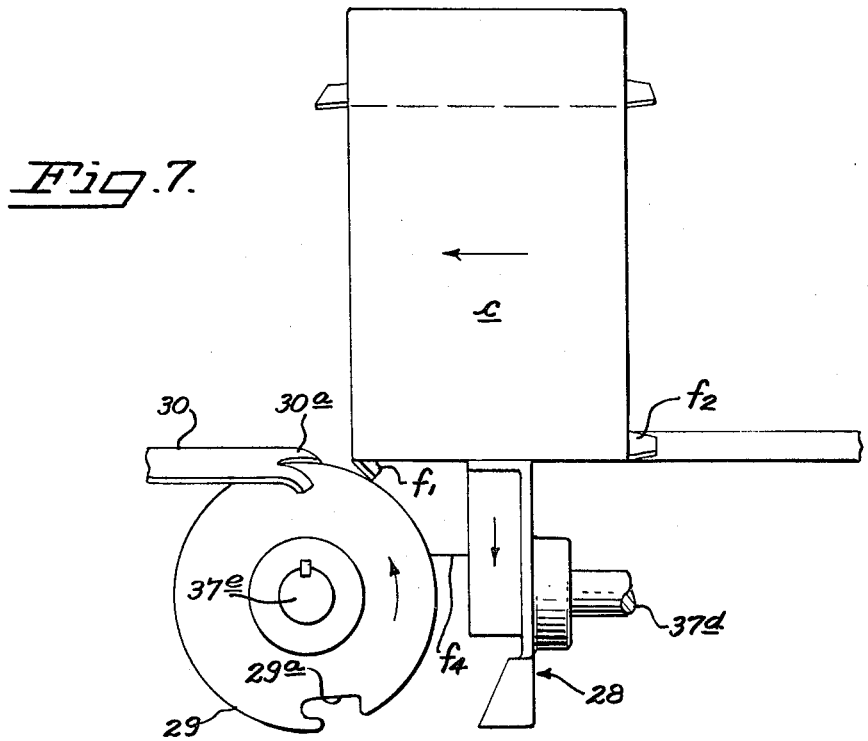
Figure 8:
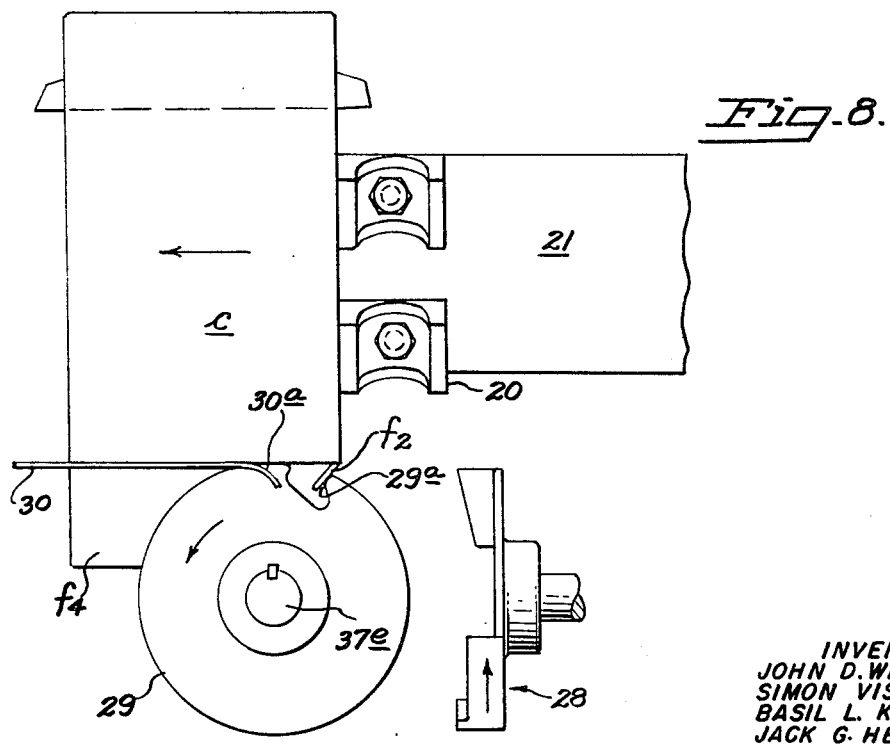

A vertically disposed third tucker wheel 29 comprises a notch portion 29a arranged to cooperate with a second backup blade 30 (FIG. 7). The blade has a sloped, bifurcated portion 30a arranged to aid in one flap positioning and guiding step in the carton forming method.

A vertically disposed, disc-shaped wobble means or wheel 31 is suitably mounted for rotation adjacent blade 30. As more clearly shown in FIGS. 9 and 9a (bottom, plan view of FIG. 9), the plane of the wobble wheel is askewed relative to the axis of its drive shaft. The diameter of the wheel and the angle $v$ of this plane will depend upon the degree of folding action desired. For example, this angle may be within a range of from 50° to 80° for a large number of carton applications.

The resultant "wobble motion" of the carton contacting peripheral portion of wheel 31, relative to the conveyor line of flight, may be broken down into two components: a first component in the linear direction of carton flight; and a second component substantially perpendicular to the linear flight of the carton. The latter motion functions to fold the large major flap of the carton within a space equal to its length dimensions whereas the latter motion approximates the linear speed of carton flight to substantially lessen the amount of drag otherwise imparted to the carton.

Packaging machine drive train

Referring to FIGS. 2 and 2a, the packaging machine comprises a conventional motor means 32 arranged to drive a rotatable shaft 33a of a filling turret 33 at station D, through a suitable gearing and belt arrangement generally shown at 34. Turret 33 is further arranged to drive endless belt 21 which in turn drives rotatably mounted turret 35 at station A.

Endless chain 34a of gearing and belt arrangement 34 is operatively connected to a driving means 36 for the upper flap folding means at station E. In particular, driven shafts 36a–36d (FIG. 2) are suitably arranged to cooperate with gearing means (not shown) to drive rotary elements 27', 28', 29' and 31', respectively, at predetermined rotational speeds.

An output shaft of driving means 36 is operatively connected to a driving means 37 for the lower flap folding means at station B. Driven shafts 37a–37f (FIG. 2) of the latter driving means suitably mount rotary elements 22, 23, 27, 28, 29, 31, respectively. Conventional gearing arrangements (not shown) are employed in drive means 37 to assure that each rotary element is afforded its desired rotational speed.

The output shaft of driving means 36 is further drivingly connected to an endless chain 38 which in turn drives various rotary elements, generally shown at 39, employed in the carton feeder at station A. Since the above, briefly described drive train does not in itself comprise novel aspects of this invention further discussions thereof will not be made.

Carton sealing means

The carton sealing means, generally shown at 40 in FIG. 2 and more specifically illustrated in FIGS. 10 through 13, comprises a horizontally disposed flap control bar 41 (FIG. 10) and a heat sealer 42. The flap control bar is secured to the bed portion of a stationary member 43 of the machine and comprises a suitably shaped top surface portion 41a (FIG. 11), preferably sloped transversely to the carton line of flight at an angle $w$ of from 10° to 30° relative to a horizontal plane. The flap control bar is suitably constructed and arranged to maintain flap $f_4$ in a predetermined open position. As discussed below, the flap control bar may be suitably shaped to assume different configurations depending upon the particular flap closing function desired.

Figure 11:
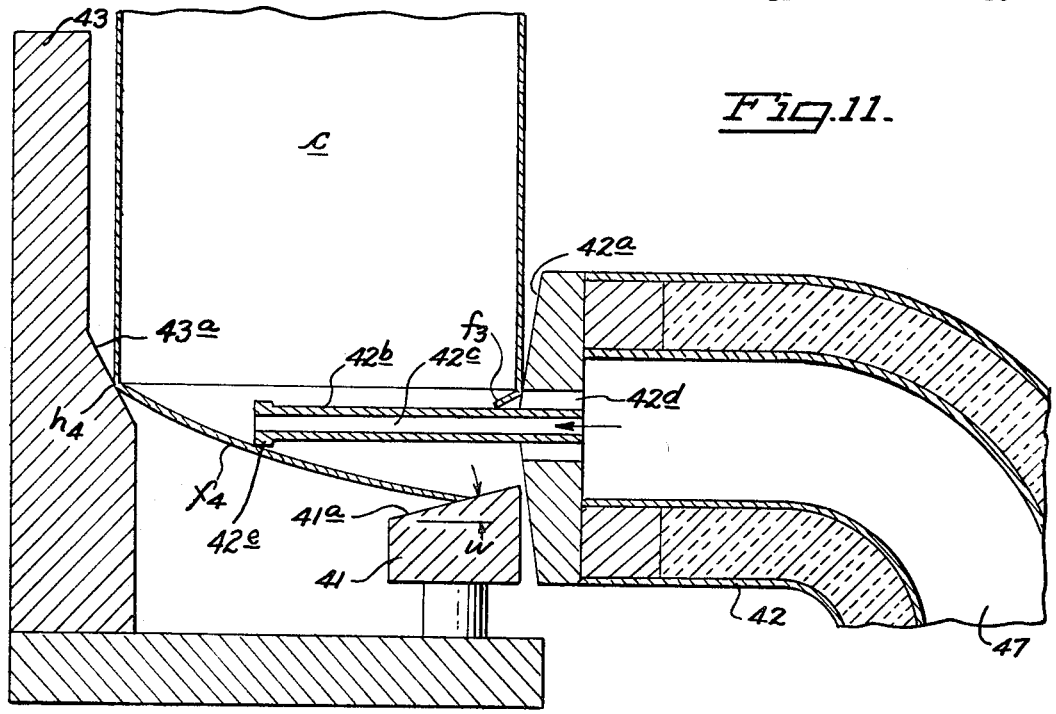
FIG. 11 is a cross sectional view of the apparatus of FIG. 10.
Figure 12:
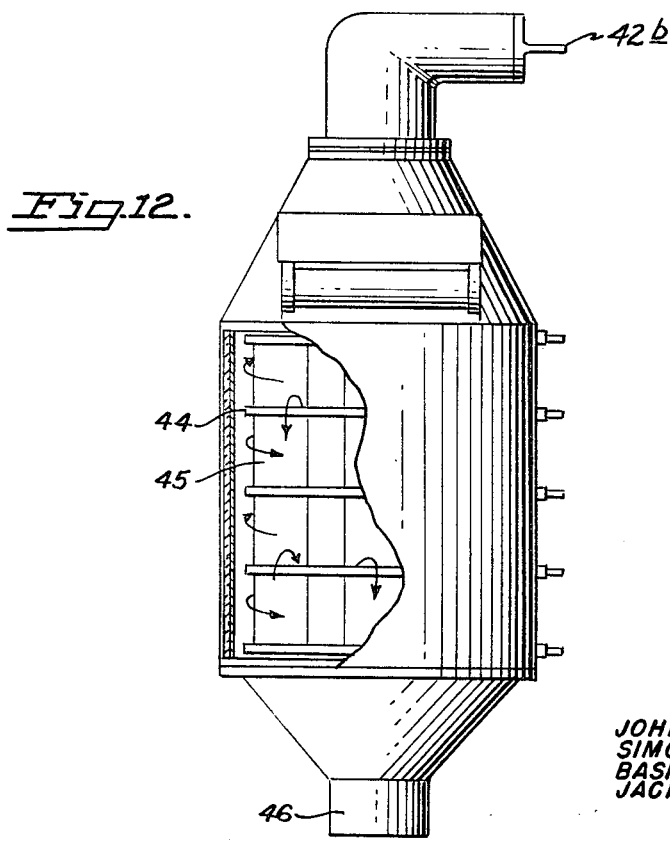
FIG. 12 is a side elevational view of a preferred heat sealer, partially shown in FIGS. 10 and 11.

The stationary member has a tapered or otherwise suitably shaped surface portion 43a which cooperates with a similarly tapered surface portion 42a of the heat sealer to provide means for guiding and maintaining the carton in a desired position above the flap control bar during its travel through the flap sealing means. Hold down bar 26 (FIG. 9) is arranged to press against the top of the carton to aid in this retaining and precise positioning function. Correct carton positioning may be further assured by the illustrated arrangement of a nozzle bar 42b (FIG. 11).

The free edge of the nozzle bar (FIG. 13) is suitably constructed and arranged to deliver heated fluid to the portions of the carton flaps requiring heat for proper sealing. A preferred nozzle bar for the carton described in this application comprises a tapered edge which lies in a plane which approximates an angle $x$ of from 5° to 30° with respect to the line of flight of the carton to vary the points from which heated fluid is discharged and to insure proper and gradual sealing. In particular, when the carton arrives at the enlarged, leading or first end of the nozzle bar, heated air is delivered directly to hinge line $h_4$ of the carton by first nozzles 42c and to other critical sealing areas of the carton by second nozzles 42d, arranged at a spaced distance from the first nozzles (FIG. 11). As illustrated, a spacer fin means 42e is secured to the extremity of the nozzle bar means for engaging and maintaining flap $f_4$ out of contact with the remaining portions thereof.

It should be understood, depending upon the particular application of the herein described sealing principles, that the free edge of the nozzle bar may comprise a straight configuration, i.e., wherein angle $x$ constitutes 0°, or other suitable configuration. For example, the above described taper (angle $x$) may be employed for one-half the nozzle bar length and a reverse taper, i.e., with the free edge extending towards the carton line of flight, may be employed for the remaining one-half of nozzle bar length. Also, the free edge of the nozzle bar may assume a curved rather than a straight configuration, if so desired, to selectively vary the points from which heated fluid is discharged.

The air is supplied in sufficient volumes and within suitable temperature and pressure ranges to activate the adhesive, but to prevent the carton from being scorched or distorted. The nozzle taper allows the point at which the heated fluid is discharged from nozzles 42c to recede from hinge line $h_4$ and to permit flap $f_4$ to gradually close as the carton continues along its line of flight. The above nozzle arrangements further function to trap heated air adjacent hinge $h_4$ of the carton, primarily due to the turbulence created by the uniquely arranged heated air streams.

If the heated air is blown into the sealing area at a substantial distance from hinge line $h_4$, turbulence may function to retain a pocket of relatively cold air in the hinge area, thus resulting in a poor seal. The above poor sealing is avoided by extending nozzles 42c to deliver heated air closely adjacent to hinge line $h_4$ and arranging shorter nozzles 42d to supply heated air adjacent small major flap $f_3$ at the other side of the carton.

From the above description, it can be further seen that another novel feature of this invention is the provision of means for discharging the heated fluid substantially transversely to and along a horizontally disposed plane of carton flight (FIG. 10). Such an arrangement provides that the heat sealer may be compactly arranged on the packaging machine and assures that the heated fluid will be efficiently utilized in the manner above described.

The remaining heat sealer constructions are substantially disclosed in U.S. patent application 251,205 to Simon Visser and J. D. Winters for "Apparatus and Method for Sealing Cartons," filed Jan. 14, 1963. In essence, heat sealer 42 (FIG. 12) may comprise a suitably insulated double walled tank arranged to contain a core assembly of electrically charged heating elements 44 and spacers 45. As described in the above application, the spacers are suitably arranged between the heating elements to provide a baffle system for dispersing the incoming air or other suitable fluid over and around the heating elements to achieve a uniform air temperature.

The air may be induced into an inlet 46 by a positive displacement blower supplying, for example, fifty-eight cubic feet of air per minute. The air may be discharged from an outlet 47 (FIG. 11) of the tank and delivered at a right angle relative to the longitudinal axis of the sealing unit. As above stated, such an arrangement permits the heat sealer to be arranged in a compact position adjacent the machine. The heated air may be delivered to the carton at a pressure approximating 0.5 p.s.i. and within a temperature range of from 600° to 1000° F. Such a pressure and temperature will, of course, depend upon the type of adhesive-sealant utilized as well as a number of other design factors apparent to those skilled in the packaging art.

The flap sealing means of FIG. 10 further includes means for applying a final closing pressure to the flaps comprising an upwardly sloped portion 41b of the flap control bar and a roller 48, rotatably mounted on stationary member 43. Roller 48 may comprise a low friction type material, such as Teflon or the like. The axis of the roller is preferably arranged to form an angle relative to the line of carton flight to evenly distribute a suitable sealing pressure to the carton flaps.

It should be understood that one or more of surface portions 42a and 43a and the flap control bar may be suitably shaped and otherwise arranged to gradually close flap $f_4$. Various configurations similar to those described above in connection with the arrangement of the free edge of the nozzle bar may be employed. For example, in lieu of sloped portion 41b of flap control bar 41, the top surface 41a of the bar may be arranged to diverge away from the bed portion of stationary member 43 towards the carton line of flight for at least a portion of its length. Such an arrangement of surface 41b will function to vary the degree to which the supported flap is opened.

The cartons are then received by an "air veyor" 50, the platen 50a of which is arranged to apply further pressure to the carton flaps in conjunction with hold down bar 26 (not shown). The "air veyor" further comprises a plurality of apertures or jet nozzles 50b formed in platen 50a adapted to discharge a blanket of cool air to thus form an air bearing. The formed air bearing functions to provide a uniform pressure to cool the heated sealant and also reduces carton drag. Platen 50a may comprise a suitable low friction material, such as Nylatron or Teflon, to further aid in reducing carton drag. The air may be supplied to nozzles 50b by a positive displacement blower (not shown) of a conventional type.

As previously stated, the upper flap folding and sealing means, utilized to close and seal the top end of the carton after the filling operation has been completed, are substantially the same as those hereinbefore described. These latter means are located on the opposite side of the machine in a suitably arranged manner. As shown in FIG. 2, wobble wheel 31' and heat sealer 42', for example, correspond to wobble wheel 31 and heat sealer 42 of FIG. 1, respectively. It should be noted that the upper flap folding means does not comprise rotary elements corresponding to tucker wheels 22 and 23 of the lower flap folding means. This constitutes the only major difference between the two flap folding means. It should be understood that the above-described folding elements may be rearranged to fold in a manner differing from that herein described.

Carton description

FIGS. 3, 3a, 3b, and 3c disclose a particular carton c which may be readily sealed pursuant to the method steps hereafter described. It should be understood that other types of cartons may be formed pursuant to this invention. The carton assumes a flattened, tubular configuration when resting in a carton magazine at station A of the machine (FIG. 1). Each end of the carton may comprise a leading minor flap $f_1$, a trailing minor flap $f_2$, a narrow major flap $f_3$, and a wide major flap $f_4$. The end edges of flap $f_4$ may be arranged to slightly diverge for aiding in the sealing function. Also, scores s in the form of knife cuts of limited depth are arranged at the carton corners to further aid in the sealing function by permitting expeditious crushing of the three superimposed layers of paperboard.

It should be noted that the following described method permits the use of such a carton which is shown as having a minimum flap overlap. The savings in the amount of paperboard used as well as the simplicity by which the carton may be formed are among the decided advantages realized by this method.

The arrangement of the upper flaps $f_1'$ through $f_4'$ is identical to the arrangement of the lower flaps $f_1$ through $f_4$. Thus, the folding and sealing steps required for the upper and lower flaps are substantially the same. Therefore, the applicable method steps involved will only be described in connection with the folding and sealing of the lower flaps.

The above-described carton may comprise a paperboard constituent preferably coated with a suitable laminant plastic coating such as polyethylene, polyvinilidene chloride or other suitable heat sensitive coating which will reactivate (melt) at temperatures approximating 500° F. Also, a "heat-seal wax," i.e., a wax coating which has been formulated to accelerate solidification thereof in a short time interval, may also be utilized. Furthermore, the method steps herein taught adapt themselves to the use of a pre-applied, thermo-plastic adhesive which has been applied during or before the carton manufacturing operation.

For purposes of these discussions, the above briefly described conventional coatings will be described as "heat sealable adhesives" or simply "adhesives." The particular adhesive chosen should, of course, afford the two-fold function of securing the flaps together and providing a sealant at the sealed portions thereof.

METHOD FOR FOLDING AND SEALING CARTONS

Figure 4:
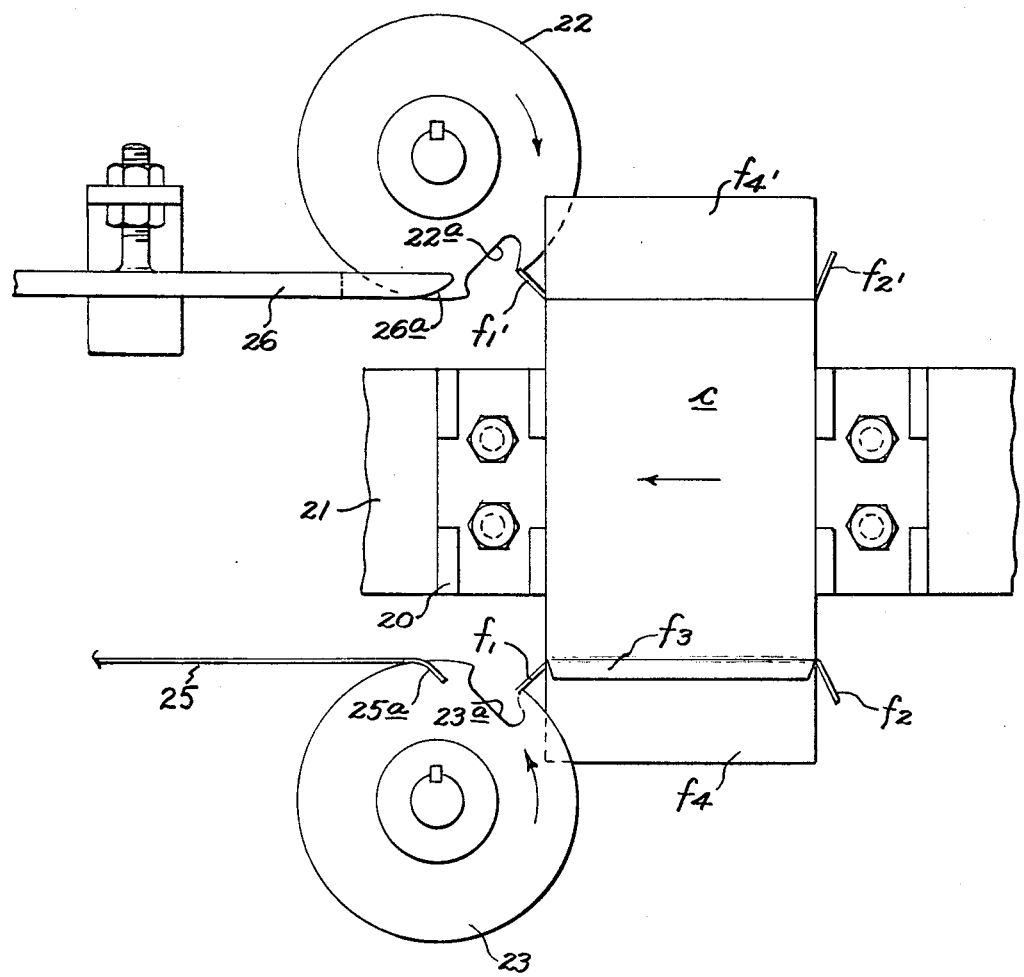

An upstanding carton is deposited into the cavity formed between adjacent carrier lugs 20 at station A (FIG. 1). Referring now to FIG. 4, notched portion 22a of tucker wheel 22 moves in a clockwise direction and cooperates with bifurcated portion 26a of hold down bar 26 for tucking or folding flap $f_1'$ thereunder. The unnotched portion of this tucker wheel is arranged for folding back the upper trailing minor flap $f_2'$ by pivoting it in a clockwise direction about its hinge line whereafter this flap is also held under the hold down bar. The hold down bar further functions for separating narrow major flap $f_3'$ and large major flap $f_4'$ in such a manner that the filling operation may be completed without undue interference by these flaps.

Notched portion 23a of tucker wheel 23 cooperates with bifurcated portion 25a of backup blade 25 for folding leading minor flap $f_1$ away from flap $f_2$ and over the backup blade. Trailing minor flap $f_2$ is held back by the smooth peripheral portions of the tucker wheel and is folded about its hinge line away from flap $f_1$ and onto the backup blade.

Spinning disc 27 (FIG. 5) is arranged for folding flap $f_3$ against the underside of thin backup blade 25 and for aligning the leading edge of this flap with ramp or sloped portion 25b of blade 25. Simultaneously therewith, flaps $f_1$ and $f_2$ are held in position on the backup blade. The disc preferably rotates at the same surface speed as the carton for reducing carton drag during this folding and guiding step. The inside of the carton, at the hinge line of flap $f_3$, is held against the blade to prevent cave-in of the adjacent face panel of the carton.

In FIG. 6, finger portion 28a of spinning finger 28 is arranged for initially folding flap $f_1$ onto flap $f_3$. The unnotched portion of tucker wheel 29 completes this folding step, as illustrated in FIG. 7. Finger portion 28a then passes out of the horizontal plane of the bottom of the carton and blade 25 and again repeats the above folding step on flap $f_1$ of the following carton.

Ramp portion 30a of blade 30 is arranged for receiving and folding end flap $f_1$ in underlying position on flap $f_3$. Thereafter, notch portion 29a of tucker wheel 29 folds trailing flap $f_2$ onto ramp portion 30a wherefrom flap $f_2$ is folded under flap $f_3$ on the top surface of blade 30 (FIG. 9). Thus, flaps $f_1$, $f_2$, and $f_3$ are folded into their predetermined positions.

Wobble wheel 31 rotates for folding large major flap $f_4$ under blade 30 and then over the sloped, leading edge of flap control bar 41 prior to the sealing operation. As previously stated, the wobble wheel has a surface speed or motion component equal to the linear speed of the carton to reduce carton drag. The motion and resulting force component, acting in a direction substantially perpendicular to the line of flight of the carton, functions to fold flap $f_4$ as illustrated in FIG. 9a. Thus, the flap may be uniquely folded within a space approximating the length dimension of the carton, taken in the direction of carton flight.

Referring now to FIG. 10, the suitably shaped surface 41a of flap control bar 41 is arranged for guiding and maintaining flap $f_4$ in a precisely held, open position for purposes of receiving the large, leading end of tapered nozzle bar 42b. Precise positioning and support of the carton and its flaps is further provided by suitably arranged wall portions 42a and 43a of the heat sealer and the upstanding wall of stationary member 43, respectively.

As the carton moves along its line of flight, heated air is delivered directly to hinge line $h_4$ by extended nozzles 42c, as shown in FIG. 11. Nozzles 42d deliver heated air to the area adjacent flap $f_3$. The point at which heated air is directed towards hinge line $h_4$ gradually recedes therefrom due to the tapered arrangement of the free end of the nozzle bar (FIG. 13).

The tapered nozzle bar simultaneously provides for a gradual closing of flap $f_4$ as the carton leaves the heat sealer and also aids in trapping the heated air at critical sealed portions of the carton. The latter function results primarily due to the turbulence inherently created by the heated air streams ejected from nozzles 42c and 42d.

Upwardly sloping bar portion 41b of the flap control bar 41 aids in applying a pressure to seal the carton flaps along with roller 48. The cartons are then transferred to the "air veyor" 50 wherefrom constant air streams, preferably approximating 50° F., are emitted through nozzles 50a to thus provide an air bearing of uniform pressure primarily for purposes of cooling the sealant and reducing carton drag to prevent scuffing and skewing of the carton relative to its line of flight.

The carton is then filled through the open top of the carton at station D and the top flaps are thereafter folded and sealed at stations E and F in a manner substantially similar to that hereinbefore described in connection with the folding and sealing of the lower flaps.

The carton formed by the afore-described apparatus and method has been found to greatly increase the barrier value, i.e., resistance to moisture penetration, relative to conventional sealing apparatus and methods. Furthermore, tests have shown that sealing will take place under conditions wherein the cartons are actually sprayed with water during filling. This is an important advantage when packaging occurs under ordinary frozen food plant operating conditions wherein the humidity and temperature ranges make it difficult for conventional apparatus and methods to form a completely sealed carton.

It should be noted that the above described "air veyor" may be suitably employed at other stations of the machine whereat stationary bar contact with the carton tends to scuff the carton and also inhibit its movement through the machine.

We claim:

1. An apparatus for progressively folding and sealing adhesively treated flaps of a carton comprising conveyor means for moving the cartons in a line of flight, flap folding means for folding the flaps into superimposed position, flap sealing means comprising first means for positioning said folded carton flaps and second means for subjecting adhesively treated portions of said flaps to a heated fluid and for applying a final sealing pressure to said flaps, said first means including support means arranged substantially parallel with respect to said line of flight for engaging and supporting only a free edge of one of said carton flaps, said second means arranged to extend across said supporting means.

2. The invention of claim 1 further comprising means for creating a uniform cushion of air against the sealed flaps for cooling the adhesively treated portions thereof and for reducing carton drag.

3. The invention of claim 1 wherein said support means comprises a flap control bar extending in the direction of said conveyor means having surface means suitably formed thereon for maintaining a carton flap in a partially opened position during at least a portion of its flight through said flap sealing means.

4. The invention of claim 3 wherein said surface means is sloped transversely to the carton line of flight along at least a portion thereof.

5. The invention of claim 3 wherein said surface means is sloped in the direction of and relative to the carton line of flight to vary the degree to which said carton flap is opened.

6. The invention of claim 1 wherein said second means comprises a nozzle bar means arranged in the direction of carton line of flight to deliver the heated fluid to selected portions of said flaps during passage of said flaps through said flap sealing means.

7. The invention of claim 6 wherein at least a portion of said nozzle bar means is tapered down in the direction of the carton line of flight for discharging the heated fluid therethrough and for varying the point from which heated fluid is discharged to said carton flaps.

8. In an apparatus for folding flaps of a carton, conveyor means arranged to move cartons along a horizontally disposed line of flight and further arranged to cooperate with a plurality of rotatably mounted elements horizontally and vertically disposed relative to said line of flight, said elements comprising a vertically disposed first tucker wheel arranged to engage and fold a carton flap, a horizontally disposed spinning disc arranged to engage and fold a carton flap transverse to said line of flight, a vertically disposed spinning member arranged to have a portion thereof rotate above a horizontally disposed plane containing said spinning disc, a vertically disposed second tucker wheel arranged to engage and fold a carton flap, and a substantially vertically disposed wobble wheel arranged to have a "wobble motion" relative to said line of flight.

9. The invention of claim 8 further comprising a horizontally disposed first backup blade arranged to extend between and closely adjacent to said first tucker wheel and said spinning finger and a horizontally disposed second backup blade arranged to extend between and closely adjacent to said second tucker wheel and said wobble wheel.

10. The invention of claim 9 wherein said first backup blade has a ramp portion formed thereon arranged between said spinning disc and said spinning finger, said ramp portion further arranged to cooperate with said spinning disc to receive a folded flap therefrom and guide said flap from a bottom surface to a top surface of said first backup blade.

11. An apparatus for folding flaps of a carton comprising conveyor means arranged to move cartons at a substantially uniform speed in a first direction along a horizontal line of flight and further arranged to cooperate with a plurality of sequentially arranged elements horizontally and vertically disposed relative to said horizontal line of flight, said elements comprising a vertically disposed first rotary element having a notched-out portion formed thereon arranged to engage and fold a carton flap in said first direction, and a smooth portion arranged to engage and fold a carton flap in a second direction opposite to said first direction, a horizontally disposed first backup blade arranged to have a first end thereof cooperate with said first rotary element for flap folding and positioning purposes, a horizontally disposed second rotary element arranged closely adjacent to a lower surface of said first backup blade between the first end and a second end thereof to fold a flap in a third direction transverse to said line of flight, a vertically disposed third rotary element arranged to have a portion thereof rotate above and closely adjacent to the second end of said first backup blade to fold a carton flap in said second direction, a vertically disposed fourth rotary element arranged adjacent to said third rotary element and having a notched-out portion formed thereon arranged to engage and fold a carton flap in said first direction, a horizontally disposed second backup blade arranged to have a first end thereof cooperate with said fourth rotary element for flap folding and positioning purposes, and a substantially vertically disposed fifth rotary element arranged adjacent to a second end of said second backup blade to fold a flap in a fourth direction opposite to said third direction.

12. The invention of claim 11 further comprising means for rotating said second rotary element so that the average speed of flap engaging surface portions thereof in the direction of conveyor flight approximates the speed of said conveyor to reduce carton drag.

13. The invention of claim 11 wherein said fifth rotary element comprises a circular disc substantially lying in a plane which is disposed at an angle of from 10° to 40° with respect to a vertically disposed plane containing said line of flight of said conveyor.

14. In an apparatus for folding cartons, a rotatably mounted tucker wheel having a notched portion formed on the periphery thereof adapted to engage and fold a carton flap and a blade member arranged adjacent to said tucker wheel, said blade member having a bifurcated end portion formed thereon arranged to intersect and cooperate with said tucker wheel for receiving said folded carton flap thereon.

15. The invention of claim 14 further comprising a second rotatably mounted tucker wheel having a notched portion formed on the periphery thereof adapted to engage and fold a carton flap and means operatively connecting said tucker wheels for simultaneous rotation.

16. In an apparatus for folding cartons, conveyor means for moving said cartons along a line of flight contained in a horizontally disposed plane and, rotary disk wobble means lying in a plane which is disposed at an angle of from 50° to 80° with respect to said horizontally disposed plane for engaging of flap of said carton with the peripheral surface of said wobble means.

17. The invention of claim 16 wherein said conveyor means is arranged for moving cartons in a line of flight at a substantially uniform speed, said rotary wobble means arranged adjacent to said conveyor means with its axis disposed substantially perpendicular with respect to said line of flight, said rotary wobble means having surface portions arranged to engage and fold a flap of a carton moved by said conveyor means and means for rotating said wobble means so that the average speed of said surface portions in the direction of carton flight approximates the speed of said conveyor means to reduce carton drag.

18. In a packaging machine, a sealing means for sealing adhesively treated carton flaps comprising a horizontally disposed flap control bar arranged to have a top surface portion thereof maintain an edge only of a carton flap thereon to maintain said flap in partially open position said discharge means arranged adjacent to and extending across said flap control bar for discharging a heated fluid onto said carton flap.

19. The invention of claim 18 further comprising juxtaposed wall support means arranged to have said flap control bar therebetween for supporting edges of a carton at a predetermined distance above said flap control bar.

20. The invention of claim 18 wherein at least a portion of the top surface portion of said flap control bar is sloped at an angle transversely to a horizontal plane of carton flight which is within a range of from 10° to 30°.

21. The invention of claim 18 wherein at least a portion of the top surface portion of said flap control bar is sloped in the direction of and relative to a horizontal plane of carton flight to vary the degree to which said carton flap is opened.

22. The invention of claim 19 wherein said discharge means comprises a nozzle bar arranged to extend between said wall support means and past said flap control bar to discharge a heated fluid adjacent the hinge line of the flap maintained on said flap control bar.

23. The invention of claim 22 wherein said nozzle bar terminates in a free edge which is tapered along at least a portion of its length to substantially lie in a plane disposed at an angle relative to the carton line of flight which is within a range of from 5° to 30°.

24. The invention of claim 18 further comprising means for applying a final sealing pressure to the flap maintained on said flap control bar.

25. In a sealing means for sealing adhesively treated carton flaps, first means for moving a carton in a horizontally disposed plane of flight, second means arranged in spaced relationship and substantially in said plane for engaging and supporting two opposite edges of said carton by line contact only and third means for discharging a heated fluid substantially transversely and parallel to said horizontally disposed plane of flight whereby the heated fluid is discharged onto and trapped at critical portions of the carton flap.

26. In a sealing means for sealing adhesively treated carton flaps, first means for moving a carton in a plane of flight and maintaining a flap in open position relative to said plane of flight and second means for discharging a heated fluid whereby the treated fluid is discharged onto and trapped at critical portions of the carton flap, said second means comprising an extended nozzle bar having a plurality of first nozzles arranged to discharge a heated fluid onto a first portion of a carton and a plurality of second nozzles arranged to discharge a heated fluid onto a second portion of the carton at a spaced distance from the discharge from said first nozzles whereby the heated fluid may be trapped at the critical portions of the carton.

27. In a sealing means for sealing adhesively treated carton flaps, conveying means arranged to move a carton along a linear path, and a nozzle bar means arranged to deliver a heated fluid to selected portions of said carton flaps, said nozzle bar means having a free edge constructed and arranged to gradually recede the point relative to a carton line of flight wherefrom said heated fluid is discharged, at least a portion of the free straight edge of said nozzle bar means being tapered to lie in a plane arranged substantially perpendicular relative to said linear path and disposed at an angle of from 5 to 30° relative to the carton line of flight.

28. In a packaging machine, a sealing means for sealing adhesively treated carton flaps comprising a stationary member having a horizontally disposed bed portion and a vertically disposed wall portion, a horizontally disposed flap control bar arranged on the bed portion of said stationary member, said flap control bar having a top surface arranged to position a flap thereon, discharge means arranged adjacent said flap control bar for discharging a heated fluid towards the vertically disposed wall of said stationary member, said discharge means comprising a sloped surface portion arranged to converge with a sloped surface portion formed on the vertically disposed wall of said stationary member towards the bed portion of said stationary member to hold a carton at a predetermined distance above said flap control bar, and a horizontally disposed nozzle bar arranged above said flap control bar, said nozzle bar comprising first discharge passages formed in said nozzle bar arranged to cooperate with second discharge passages formed in said discharge means and arranged closely adjacent to said nozzle bar to discharge a heated fluid towards the vertically disposed wall of said stationary member, and a tapered free end arranged adjacent the vertically disposed wall of said stationary member for varying the points at which heated fluid is discharged from the first discharge passages, and final flap closing means for applying a pressure to the heated adhesively treated carton flaps.

29. An apparatus for progressively folding and sealing adhesively treated flaps of a carton comprising conveyor means for moving a carton in a predetermined line of flight, a folding means comprising a plurality of elements sequentially arranged in relative horizontally and vertically disposed planes, said elements comprising a first vertically disposed rotary tucker wheel, a horizontally disposed hold down bar having an upwardly sloped portion arranged adjacent said first tucker wheel to cooperate therewith for flap folding purposes, a second rotary tucker wheel vertically disposed below said first tucker wheel, means operatively connecting said first and second tucker wheels together for simultaneous rotation, a horizontally disposed first backup blade having a first downwardly sloped portion arranged at a first end thereof adjacent said second tucker wheel to cooperate therewith for flap folding purposes and a second downwardly sloped portion arranged adjacent a second end thereof, a horizontally disposed rotary spinning disc arranged closely adjacent to a lower surface of said first backup blade between the first and second ends thereof, a vertically disposed rotary spinning finger arranged closely adjacent to the second end of said first backup blade, said spinning finger comprising an extended finger portion arranged to rotate above and closely adjacent to the second end of said first backup blade, a third vertically disposed rotary tucker wheel arranged adjacent to said spinning finger, said first, second and third tucker wheels each comprising a notched-out portion adapted to engage and fold a carton flap, a horizontally disposed second backup blade having a downwardly sloped portion arranged at a first end thereof adjacent said third tucker wheel to cooperate therewith for flap folding purposes, a vertically disposed rotary wobble wheel arranged adjacent to a second end of said second backup blade, the vertical plane of said wobble wheel being askewed relative to its rotational axis, drive means for simultaneously rotating said first, second and third tucker wheels, spinning disc, spinning finger and wobble wheel at individually selected speeds, sealing means comprising a stationary member arranged to support a horizontally disposed flap control bar, said flap control bar having a downwardly sloped first end thereof arranged adjacent said wobble wheel and a sloped top surface arranged to position a flap thereon, a horizontally disposed nozzle bar means tapered along at least a portion of its length and arranged above said flap control bar for discharging a heated fluid therefrom and for permitting the flap positioned on said flap control bar to be gradually closed, wall support means formed on said stationary member and on said heat sealing means for supporting a carton thereon and to aid in positioning the flap on said flap control bar and final flap closing means for applying a pressure to the heated, adhesively treated carton flaps and for providing an air cushion therefor.

30. A method for folding and sealing a tubular carton arranged to move along a line of flight, said carton having adhesively treated end flaps hingedly connected to at least one end thereof and arranged to be folded and sealed to form a sealed end closure, said method comprising the steps of substantially folding the flaps into superimposed position, maintaining at least one of the flaps in open position along the carton line of flight, discharging a heated fluid onto the carton flaps at first and second spaced apart positions along and substantially parallel to the line of carton flight, gradually receding the point from which said heated fluid is discharged away from said line of flight, and applying a pressure to the flaps to form a sealed end closure.

31. The invention of claim 30 wherein said flaps are folded into superimposed position by rotating elements thereagainst.

32. The invention of claim 30 wherein said discharging step includes inserting a nozzle bar between said flaps.

33. The invention of claim 30 further comprising the step of gradually closing the opened flap during said receding step.

34. In a method for sealing at least one adhesively treated carton flap, a hinge line connecting said flap to a panel of the carton, the steps comprising moving the carton along a line of flight, maintaining the flap in partially open position, discharging a heated fluid from a position closely adjacent to and towards the hinge line and discharging a heated fluid from a position spaced from the hinged line at a greater distance than the position wherefrom the heated fluid is discharged closely adjacent to the hinge line to create thereby a turbulence to trap heated fluid at selected portions of the carton.

35. The invention of claim 34 further comprising the step of discharging a heated fluid from a position spaced from the hinge line at a greater distance than the position wherefrom the heated fluid is discharged closely adjacent to the hinge line to create thereby a turbulence to trap heated fluid at selected portions of the carton.

36. The invention of claim 34 wherein the position wherefrom heated fluid is discharged varies relative to the hinge line.

37. A method for folding and sealing a tubular carton, said carton comprising an upstanding body portion of rectangular cross section terminating at an end thereof in hingedly connected first, second, third and fourth flaps, said flaps coated with a heat sealable adhesive, said method comprising the steps of moving said carton at a uniform speed in a line of flight led by the first flap and trailed by the second flap, folding the first flap away from said second flap by rotary motion, folding the second flap away from said first flap by rotary motion, holding the first and second flaps in position and simultaneously folding the third flap towards the fourth flap by rotary motion, folding the first flap onto the third flap by rotary motion, folding the second flap onto the third flap by rotary motion, folding the fourth flap over the first, second and third flaps by rotary motion, guiding and retaining the flaps in position with the fourth flap precisely held in partially opened position, delivering a heated fluid directly to the hinge line of the fourth flap and to the area adjacent the third flap to substantially melt the heat sealable adhesive, gradually receding the points at which the heated fluid is directed towards the hinge line of the fourth flap and simultaneously gradually closing the fourth flap on the first, second, and third flaps, applying a pressure to seal the flaps, and creating a cushion of air against the sealed flaps to cool the heat sealable adhesive and to reduce carton drag.

38. In an apparatus for folding flaps of a carton, conveyor means arranged to move cartons along a horizontally disposed line of flight and a spinning finger member mounted for rotation on an axis arranged substantially parallel to said line of flight, said spinning finger member comprising a finger portion arranged at a radius from said axis which is greater than the radii of other peripheral portions thereof.

39. The invention of claim 38 wherein one of said peripheral portions of said spinning finger member comprises flap positioning surface portions connected to and extending from said finger portion and having a width in the direction of said axis greater than the width of said finger portion.

40. The invention of claim 39 wherein said peripheral portions further comprise additional flap positioning surface portions arranged between said finger portion and said first mentioned flap position surface portions.

41. The invention of claim 38 further comprising a tucker wheel mounted for rotation on an axis arranged adjacent to and substantially perpendicular with respect to said line of flight and the rotational axis of said spinning finger member, said tucker wheel having a notched portion formed on the periphery thereof.

42. An apparatus for bonding first and second adhesively treated flaps of a carton together, said first flap being hingedly foldable with respect to said second flap about a hinge line lying substantially in the plane of said second flap when said flaps are bonded to each other, said apparatus comprising: conveying means for moving said carton in the direction of the plane of said panels, means for folding said flaps into a substantially V position and for holding said flaps in said position, and nozzle bar means extending at least partially between said flaps and into the V formed thereby, said nozzle bar means comprising first discharge means positioned on said nozzle bar means for discharging a heated fluid directly onto adhesively treated portions of said first flap and second discharge means positioned on said nozzle bar means and at a spaced distance from said first discharge means for discharging a heated fluid directly onto adhesively treated portions of said second flap.

43. The invention of claim 42 further comprising a spacer fin means secured to an extremity of said nozzle bar means for engaging and maintaining said first flap out of contact with the remaining portions of said nozzle bar means.

44. The invention of claim 42 wherein said nozzle bar means comprises opposite first and second sides extending in the direction of the plane of said panels, said first discharge means positioned at the first side of said nozzle bar means and said second discharge means positioned at the second side of said discharge means.

45. The invention of claim 42 wherein each of said first and second discharge means comprises a series of nozzles disposed on said nozzle bar means in the direction of the plane of said panels.

References Cited

UNITED STATES PATENTS

| | | | |
|---|---|---|---|
| 2,192,950 | 3/1940 | Widell | 93—52 |
| 2,318,208 | 5/1943 | First et al. | 93—44 |
| 2,425,062 | 8/1947 | Johnson | 53—375 |
| 2,669,167 | 2/1954 | Behl. | |
| 2,783,693 | 3/1957 | Felber | 93—52 |
| 2,931,277 | 5/1960 | La Bombard | 93—52 |
| 3,084,489 | 4/1963 | Seefluth | 53—39 |
| 3,269,092 | 8/1966 | MacDonald | 93—52 X |
| 3,302,365 | 2/1967 | Currie | 53—37 X |

BERNARD STICKNEY, *Primary Examiner.*